(12) United States Patent
Sinphay et al.

(10) Patent No.: US 11,665,795 B2
(45) Date of Patent: May 30, 2023

(54) THERMALLY PROTECTED LOW PROFILE LED LUMINAIRE

(71) Applicant: Hubbell Incorporated, Shelton, CT (US)

(72) Inventors: Anthony Sinphay, Greenville, SC (US); Dhavalkumar Patel, Greer, SC (US); William Thomas, Anderson, SC (US)

(73) Assignee: Hubbell Incorporated, Shelton, CT (US)

( * ) Notice: Subject to any disclaimer, the term of this patent is extended or adjusted under 35 U.S.C. 154(b) by 135 days.

(21) Appl. No.: 16/895,679

(22) Filed: Jun. 8, 2020

(65) Prior Publication Data

US 2020/0389954 A1    Dec. 10, 2020

Related U.S. Application Data

(60) Provisional application No. 62/858,593, filed on Jun. 7, 2019.

(51) Int. Cl.

| *F21S 8/00* | (2006.01) |
|---|---|
| *F21V 29/00* | (2015.01) |
| *H05B 45/18* | (2020.01) |
| *G01K 7/22* | (2006.01) |
| *F21V 29/503* | (2015.01) |
| *F21Y 115/10* | (2016.01) |

(52) U.S. Cl.
CPC .......... *H05B 45/18* (2020.01); *F21V 29/503* (2015.01); *G01K 7/22* (2013.01); *F21Y 2115/10* (2016.08)

(58) Field of Classification Search
CPC ........ H05B 45/18; H05B 45/56; H05B 45/00; H05B 45/30; F21Y 2115/10; F21S 8/00; F21S 8/03; F21V 29/00; F21V 29/503; F21V 29/505

See application file for complete search history.

(56) References Cited

U.S. PATENT DOCUMENTS

| 7,677,766 | B2 | 3/2010 | Boyer |
|---|---|---|---|
| 8,201,968 | B2 | 6/2012 | Maxik et al. |
| 8,246,203 | B2 | 8/2012 | Hancock |
| 8,596,837 | B1 | 12/2013 | Wronski |
| 8,672,518 | B2 | 3/2014 | Boomgaarden et al. |
| 8,716,943 | B2 | 5/2014 | Oyaizu |
| 9,010,956 | B1 | 4/2015 | Davis |
| 10,227,036 | B2 * | 3/2019 | Saito ..................... F21S 41/148 |
| 10,563,851 | B2 | 2/2020 | Morales et al. |
| 2007/0195532 | A1 | 8/2007 | Reisenauer et al. |
| 2009/0296387 | A1 | 12/2009 | Reisenauer et al. |
| 2012/0182744 | A1 | 7/2012 | Santiago et al. |
| 2012/0286663 | A1 | 11/2012 | Puvanakijjakorn et al. |

(Continued)

*Primary Examiner* — Thai Pham
(74) *Attorney, Agent, or Firm* — Robinson & Cole LLP

(57) ABSTRACT

A lighting fixture includes a fixture housing. A circuit board is positioned in the fixture housing. The circuit board includes a driver circuit. A plurality of light emitters are disposed on the circuit board. The light emitters are operatively connected to the driver circuit to produce a light output. A temperature sensor is disposed on the circuit board, the temperature sensor configured to measure a temperature of the circuit board and output a signal. The driver circuit is configured to reduce the light output in response to the signal from the temperature sensor.

20 Claims, 11 Drawing Sheets

(56) References Cited

U.S. PATENT DOCUMENTS

| | | |
|---|---|---|
| 2013/0114279 A1* | 5/2013 | Marley ................ F21S 41/153 |
| | | 362/516 |
| 2013/0188353 A1 | 7/2013 | Nankil |
| 2014/0036516 A1 | 2/2014 | Sampsell et al. |
| 2014/0139108 A1* | 5/2014 | Sarmadi ................ F21V 7/0016 |
| | | 362/235 |
| 2015/0252970 A1 | 9/2015 | Athalye |
| 2015/0366037 A1 | 12/2015 | Dvash |
| 2018/0058676 A1* | 3/2018 | Huang .................. F21V 19/003 |
| 2018/0232030 A1* | 8/2018 | Chan ......................... G06F 1/26 |
| 2020/0056756 A1* | 2/2020 | Kim ...................... F21S 41/336 |

* cited by examiner

THERMALLY PROTECTED LOW PROFILE LED LUMINAIRE

FIELD

The present subject matter relates generally to luminaires used in enclosed environments, such as indoor luminaires used in closets.

BACKGROUND

Light fixtures can be used to provide lighting for a space, such as a building or room. Light emitting diode (LED) devices and other solid state devices are becoming increasingly used in many lighting applications and have been integrated into a variety of lighting fixtures. Use of LED light sources in light fixtures can provide increased efficiency, life and durability, can produce less heat, and can provide other advantages relative to traditional incandescent and fluorescent lighting systems. Moreover, the efficiency of LED light sources has increased such that higher power can be provided at lower cost to the consumer.

The use of LED light sources has allowed for the provision of "low profile" light sources. These low profile light sources can be surface mounted to a ceiling or other surface adjacent to a junction box or can housing of a can lighting fixture. The shallow depth of the low profile lighting fixtures can reduce the intrusion of the lighting fixture from the surface into the space. To accommodate their shallow depth, low profile lighting fixtures often include a single circuit board that includes both the LED devices as well as other electronic components for driver circuits used to power the LED devices.

SUMMARY

According to certain aspects, a lighting fixture includes a fixture housing. A circuit board is positioned in the fixture housing. The circuit board includes a driver circuit. A plurality of light emitters are disposed on the circuit board. The light emitters are operatively connected to the driver circuit to produce a light output. A temperature sensor is disposed on the circuit board. The temperature sensor is configured to measure a temperature of the circuit board and output a signal. The driver circuit is configured to reduce the light output in response to the signal from the temperature sensor.

According to certain aspects, a lighting fixture includes a fixture housing. A circuit board is positioned in the fixture housing. The circuit board includes a driver circuit. A reflector extends between the circuit board and the fixture housing. The reflector has a central portion and a sensor housing extending from the central portion. A plurality of light emitters are disposed on the circuit board. The light emitters are operatively connected to the driver circuit to produce a light output. A temperature sensor is connected the circuit board and extends into the sensor housing. The temperature sensor is configured to measure a temperature of the circuit board and output a signal. The driver circuit is configured to reduce the light output in response to the signal from the temperature sensor.

According to certain aspects, a lighting fixture includes a fixture housing. A circuit board is positioned in the fixture housing. A plurality of light emitters are disposed on a first portion of the circuit board. A driver circuit is disposed on a second portion of the circuit board. The driver circuit is operatively connected to the light emitters to produce a light output. A temperature sensor is disposed on the first portion of the circuit board. The temperature sensor is configured to measure a temperature of the circuit board and output a signal. The driver circuit is configured to reduce the light output in response to the signal from the temperature sensor. The first portion of the circuit board is spaced from the second portion of the circuit board. The first portion is positioned closer to a center of the circuit board than the second portion.

BRIEF DESCRIPTION OF THE DRAWINGS

The aspects and features of various exemplary embodiments will be more apparent from the description of those exemplary embodiments taken with reference to the accompanying drawings.

DETAILED DESCRIPTION OF EXEMPLARY EMBODIMENTS

Figure 1:
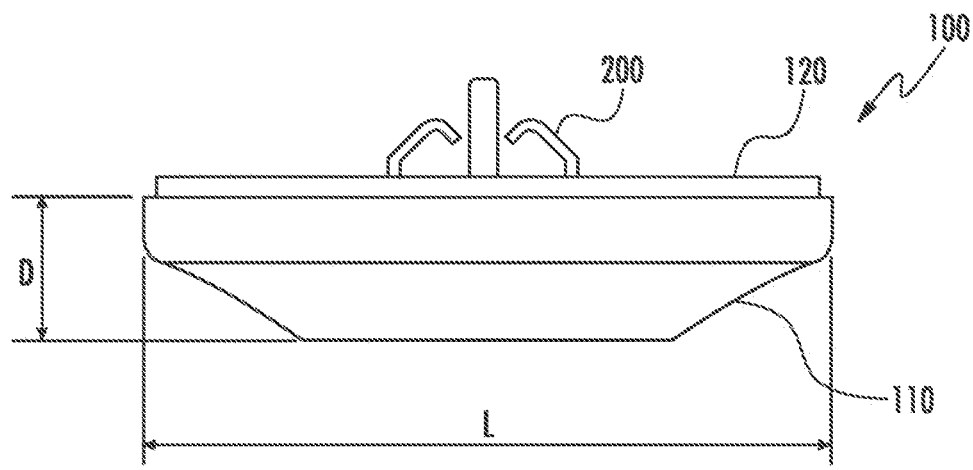
FIG. 1 depicts a side view of an exemplary light fixture.
Figure 2:
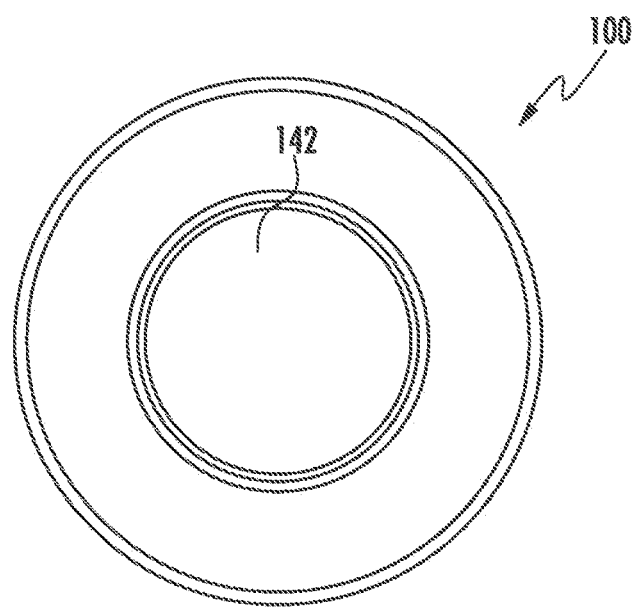
FIG. 2 depicts a bottom view of the light fixture of FIG. 1.
Figure 3:
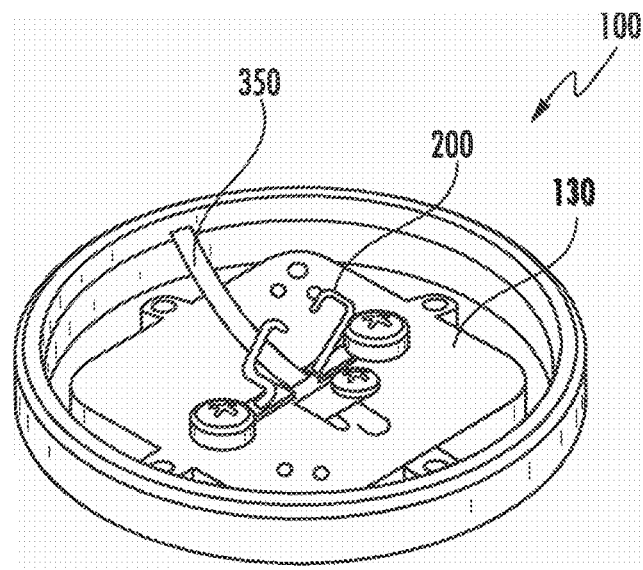
FIG. 3 depicts a top, perspective view of the light fixture of FIG. 1.
Figure 4:
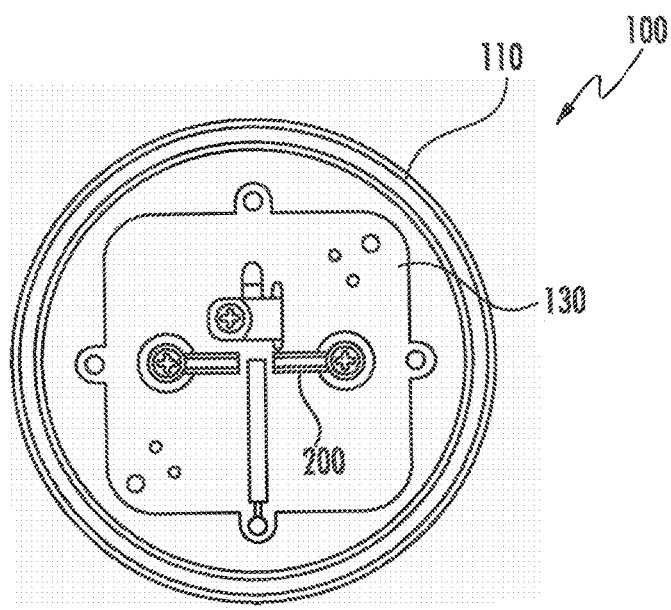
FIG. 4 depicts a top view of the light fixture of FIG. 1.

Various exemplary embodiments are directed to low profile lighting fixtures having one or more light emitting diode (LED) devices. An example low profile light fixture can be configured to be surface mounted (e.g., a ceiling or wall mounted) in a manner that covers a junction box or a recessed can housing. The low profile light fixture utilizes one or more light emitting diode (LED) devices, or other light sources, to produce a light output. The LEDs can be integrated with a circuit board. The circuit board can further include electronic components for providing and/or conditioning power to the LED devices, including larger electronic components associated with, for instance, a filter circuit and/or a flicker reducing circuit. In some embodiments, all of the electronic components and LED devices associated with the low profile lighting fixture are disposed on the same circuit board. For example, no separate driver or control circuit is needed. In some examples, the electronic components for providing and/or conditioning power to the LED devices can be arranged on the circuit board relative to the LED devices in a manner that reduces shadowing effects when the LED devices become illuminated, providing a more uniform output of light from the lighting fixture.

For example, a lighting fixture can include a fixture housing. The fixture housing can be circular in shape, rectangular in shape, square in shape, or can have other suitable shapes. The fixture housing can have a length dimension (e.g., a long dimension in the case of a rectangular shape, a diameter in the case of a circular shape, etc.). The fixture housing can also have a depth dimension. The depth dimension can be indicative of how far the lighting fixture extends from a surface when the lighting fixture is mounted to the surface. In some embodiments, a ratio of the length dimension to the depth dimension is about 0.25 or less. As used herein, the use of the term "about" in conjunction with a numerical value is intended to refer to within 25% of the stated numerical value.

The light fixture can include a single circuit board (e.g., a circuit board associated with a light engine) that includes a plurality of LED devices and a plurality of electronic components for providing and/or conditioning power or the LED devices. For instance, the electronic components can be associated with a driver circuit and/or a filter circuit. In some embodiments, the driver circuit can include AC-DC power conversion and current reduction. In some embodiments, the filter circuit can be associated with a flicker reducing circuit. The flicker reducing circuit can include one or more capacitors for filtering power signals for driving the LED devices.

The LED devices can be located on a first portion of the circuit board and the one or more electronic components can be located on a second portion of the circuit board that is separated from the first portion of the circuit board. For instance, in some embodiments, the second portion of the circuit board can be spaced radially apart from a center point on the circuit board relative to the first portion. In some embodiments, the second portion of the circuit board can at least partially surround the first portion of the circuit board. In some embodiments, the first portion of the circuit board can be located at a center portion of the circuit board and the second portion of the circuit board can be located at a peripheral portion of the circuit board. In some embodiments, none of the electronic components associated with the driver circuit and/or filter circuit are located in the first portion of the circuit board.

By separating the electronic components associated with the driver circuit, filter circuit, and/or flicker reducing circuit from the LED devices on the circuit board, the LED devices can provide illumination without interference from the electronic components with the light output from the LED devices. In this way, potential shadows that may have resulted from the one or more electronic components, particularly larger electronic components (e.g., capacitors) associated with, for instance, a flicker reducing circuit can be reduced.

FIGS. 1-5 depict a light fixture 100 according to exemplary embodiment of the present disclosure. The light fixture 100 can be a surface mount, low profile light fixture. The light fixture 100 can include a fixture housing 110. The fixture housing 110 can be adapted to be surface mounted to a ceiling, wall, or other surface.

The fixture housing 110 illustrated in FIGS. 1-5 is generally conical in shape. Those of ordinary skill in the art, using the disclosures provided herein, will understand that the lighting fixture 100 can include various curvilinear and rectilinear shapes and cross-section, without deviating from the scope of the present disclosure, such as rectangular shape, a square shape, a triangular shape, a polygonal shape, a spherical shape, etc.

The fixture housing 110 can include a length dimension L and a depth dimension D. The length dimension L can be, for instance, the diameter of a generally circular lighting fixture as shown in FIG. 1. The length dimension L can also be a dimension associated with a line that passes through a center point of the fixture housing 110 and having ends on a peripheral portion of the fixture housing 110.

The depth dimension D can be associated with a distance from a top portion of the fixture housing 110 to a bottom portion of the fixture housing 110 when the fixture housing is oriented as shown in FIG. 1. The depth dimension D can represent a distance that the fixture housing 110 extends from a surface to which the lighting fixture 100 is mounted.

According to example embodiments of the present disclosure, the lighting fixture 100 can be a low profile lighting fixture such that the depth dimension does not extend a far distance from the surface to which it is mounted. In some embodiments, a ratio of the depth dimension D to the length dimension L can be about 0.25 or less, such as about 0.18 or less.

In some embodiments, the light fixture 100 can include one or more spring clips 200 that can engage a bracket 210 in order to mount the light fixture 100 to a ceiling or other support. For instance, the bracket 210 can be secured to a junction box recessed within a ceiling. The spring clip 200 can engage the bracket 210 (e.g., by being inserted through an opening in the bracket 210) to retain the fixture 100 adjacent the surface. The spring clips 200 can form a rotatable connection with the bracket 210 so that the position of the light fixture 100 can be rotatably adjusted relative to the support. Other suitable mounting techniques can be used without deviating from the scope of the present disclosure.

The light fixture 100 can include a waterproof gasket 120. The waterproof gasket 120 can provide a seal between a surface to which the lighting fixture 100 is mounted and the fixture housing 110 so that dust, moisture, water, and/or other elements are prevented from entering the interior of the fixture housing 110. In this way, internal components (e.g., circuit board 300) can be protected from damage from external sources.

The light fixture 100 can include a silicone (e.g., silicone rubber) ring 125 and a lens 142 positioned in the housing 110. The lens 142 can be used to protect internal components of the lighting fixture (e.g., circuit board 300) and/or to condition light emitted from one or more LED devices mounted on circuit board 300 to provide a desired light output for the lighting fixture 100. The lens 142 can be, for instance, a glass, polycarbonate, acrylic, or silicone lens (with or without UV protection) or other suitable lens.

Figure 5:
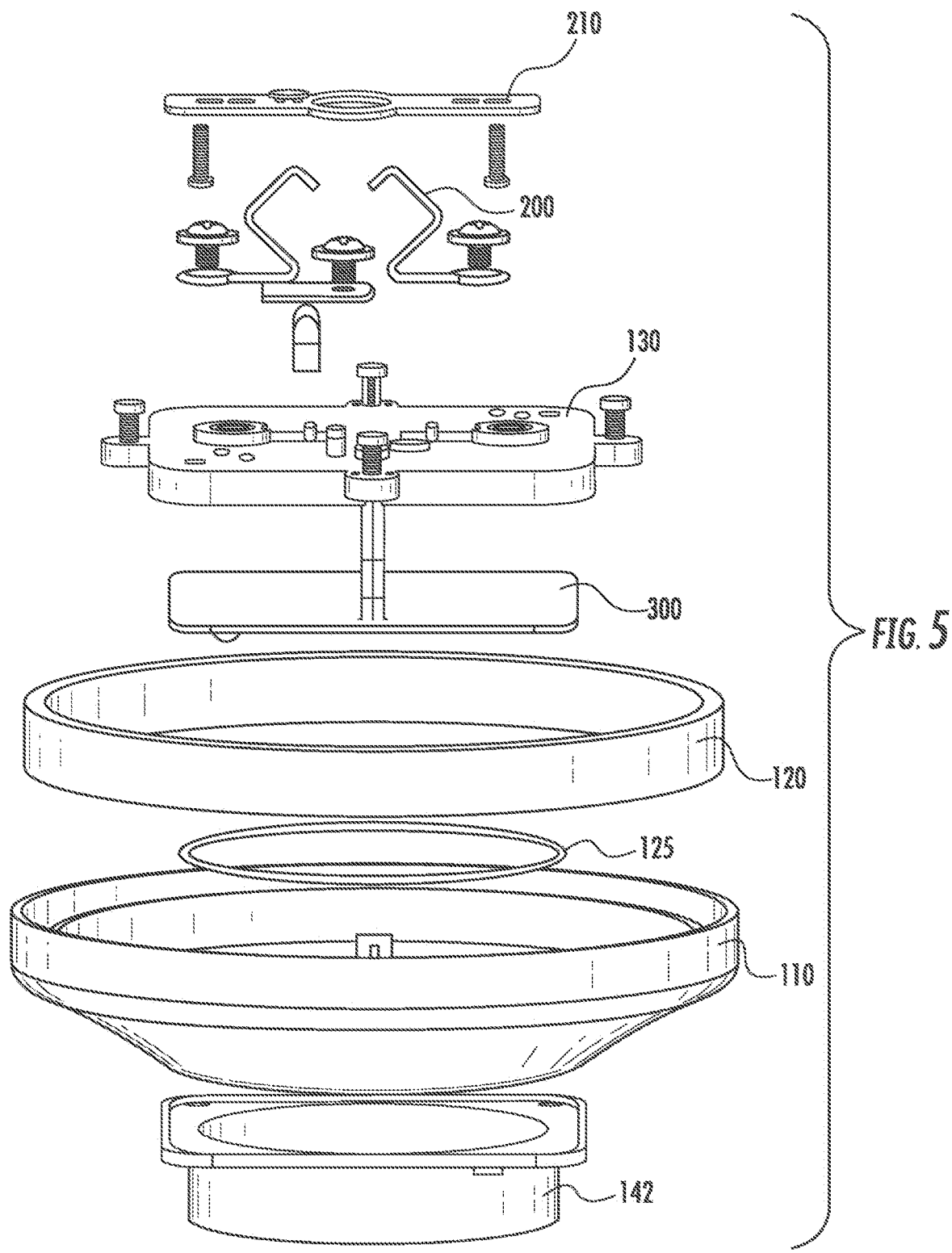
FIG. 5 depicts an exploded view of the light fixture of FIG. 1.
Figure 6:
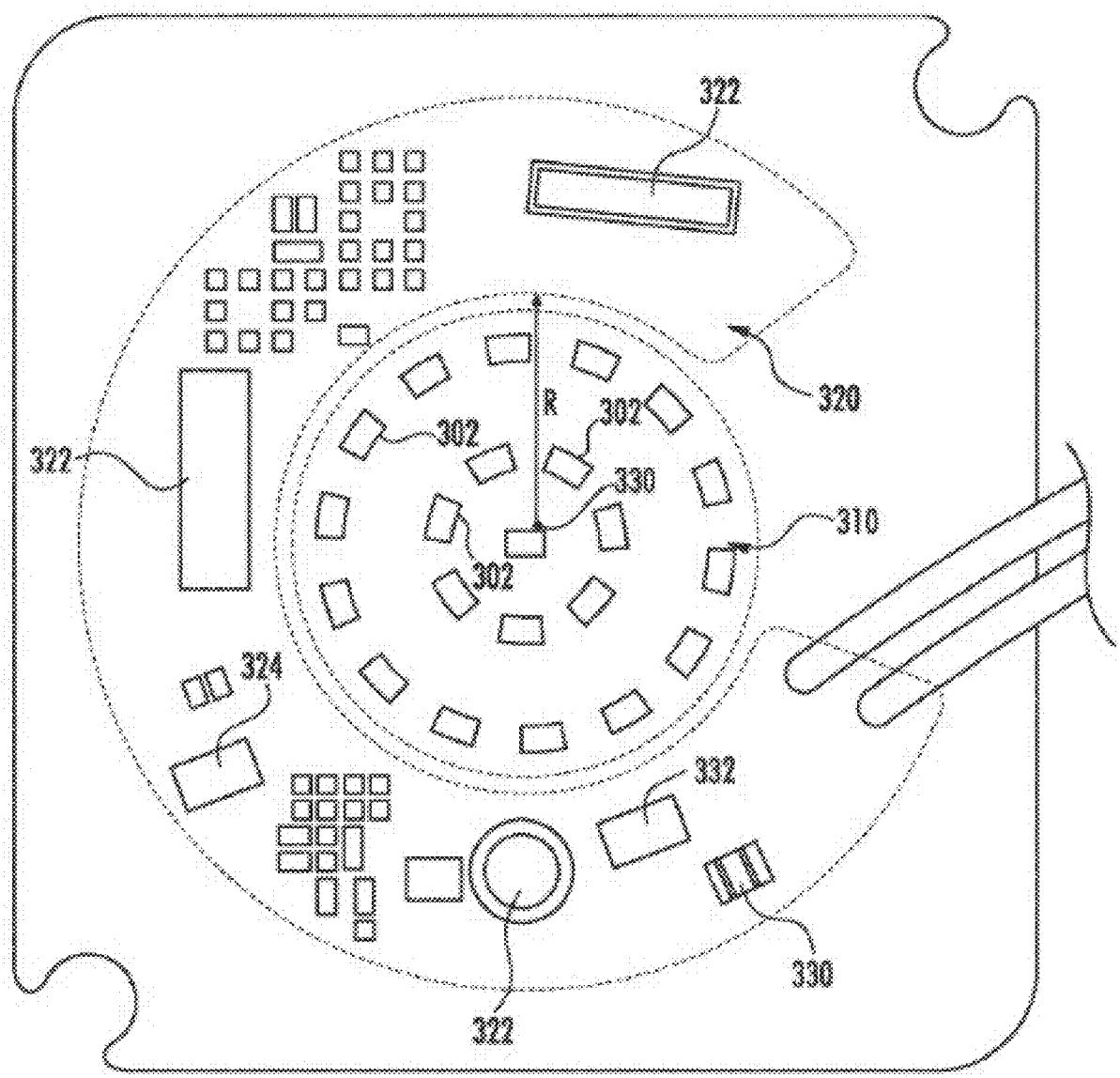
FIG. 6 depicts an exemplary circuit board layout for the LED circuit board to be used in the light fixture of FIG. 1.

As shown in FIGS. 5 and 6, the light fixture 100 can include a circuit board 300 having one or more LED devices as light sources for the light fixture 100. The circuit board 300 can be mounted on a heat sink 130 that is configured to transfer heat away from the circuit board 300. The heat sink 130 can include any suitable heat conducting material, such as a metal material. In some embodiments, the heat sink 130 can be integrally formed with the circuit board 300.

The circuit board 300 can be associated with a light engine that includes all of the necessary electronic components for powering the one or more LED devices located on the circuit board 300. For instance, the circuit board 300 can include one or more electronic components associated with a driver circuit configured to convert an input power (e.g., an input 120 V AC power) to a suitable DC power for driving the LED devices. In some embodiments, the driver circuit can be a dimmable driver circuit. The driver circuit can include various components, such as switching elements (e.g. transistors) that are controlled to provide a suitable driver output. For instance, in some embodiments, the driver circuit can include one or more transistors. Gate timing commands can be provided to the one or more transistors to convert the input power to a suitable driver output using pulse width modulation techniques The circuit board 300 can also include electronic components (e.g., semiconductor chips, capacitors, etc.) associated with a filter circuit used as part of, for instance, a flicker reducing circuit. The filter circuit can smooth power signals provided from the driver circuit so that light flicker in light emitted from the LED devices on the circuit board 300 is reduced. In some embodiments, a flicker reducing circuit can include one or more capacitors that are used to smooth the driver output of a driver circuit implemented on the circuit board 300. In some embodiments, a flicker reducing circuit can include one or more integrated circuit chips (e.g., application specific integrated circuits) that control various electronic components (e.g., transistors) based on input signals from the driver circuit to reduce light flicker in light emitted from the LED devices on the circuit board 300.

In some embodiments, the electronic components associated with a driver circuit and a flicker reducing circuit are located on the same circuit board 300 so that only one circuit board has to be included in the lighting fixture 100. This can allow for the fixture housing 110 to have a reduced depth relative to housings configured to accommodate multiple circuit boards, allowing the lighting fixture 100 to be more easily implemented as a low profile lighting fixture.

FIG. 6 depicts an example circuit board layout for circuit board 300 according to example embodiments of the present disclosure. As shown, the circuit board 300 includes a plurality of LED devices 302. The LED devices 302 are arranged as a circular array in a first portion 310 of the circuit board 300. The circuit board 300 also includes electronic components for providing and conditioning power to the plurality of LED devices 302. For instance, the circuit board 300 can include electronic components associated with a driver circuit and one or more filter circuits (e.g., including one or more capacitors). The filter circuit(s) can be associated with, for instance, a flicker reducing circuit for reducing flicker in the light output of the LED devices 302. In some embodiments, the LED array can correspond to the shape of the housing, for example a rectangular LED array can be used with a rectangular lighting fixture.

Figure 7:
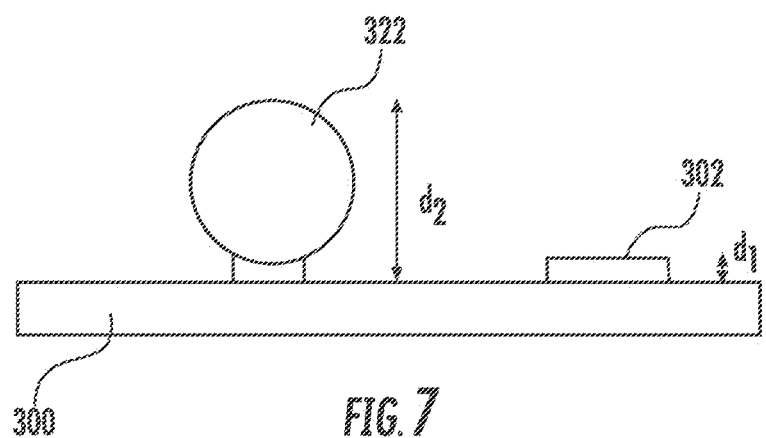
FIG. 7 depicts aside view of the circuit board of FIG. 6.
Figure 8:
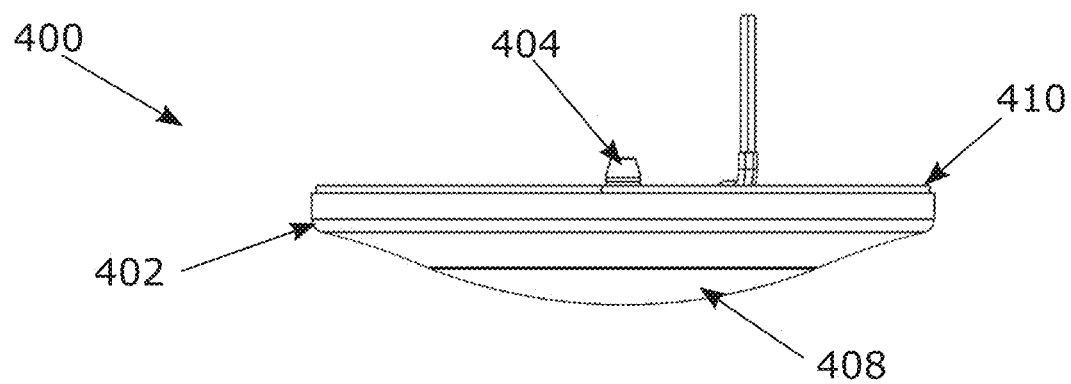
FIG. 8 depicts aside view of another exemplary light fixture.

As shown in FIG. 6, the electronic components can include, for instance, a fuse 331, capacitors 322, integrated circuits 324, and other electronic components. Some electronic components can extend a greater distance from the circuit board 300 relative to the LED devices 302. For instance, as shown in FIG. 7, an LED device can extend a first distance d1 from the circuit board 300 and a capacitor 322 associated with, for instance, a flicker reducing circuit can extend a distance d2 from the circuit board. The distance d2 can be greater than the distance d1, for example at least two times greater than the distance d1, at least four times greater than the distance d1, or at least ten time greater than the distance d1.

Referring to FIG. 6, the electronic components associated with driver circuit and flicker reducing circuit can be located in a second portion 320 of the circuit board. The second portion 320 of the circuit board 300 can be disposed in a separate location of the circuit board 300 relative to the first portion 310 of the circuit board 300 such that none of the electronic components associated with the driver circuit or the flicker reducing circuit are located in the first portion 310 of the circuit board 300. In the example of FIG. 6, the first portion 310 of the circuit board 300 can be located in a center portion of the circuit board 300. The second portion of the circuit board 300 can be located in a peripheral portion of the circuit board 300.

As shown in FIG. 6, the second portion 320 of the circuit board 300 is spaced radially apart in the radial direction R from a center point 330 on the circuit board 300. As used herein, the term "spaced radially apart" is not limited to generally circular structures but can refer to being spaced away from a central portion of the circuit board 300 towards a peripheral portion of the circuit board 300 irrespective of the shape of the circuit board 300. As shown in FIG. 6, the second portion 320 of the circuit board at least partially surrounds the first portion 310 of the circuit board 300 such that the electronic components associated with the driver circuit and/or filter circuit at least partially surround the circular array of LED devices 302.

In this way, the electronic components (e.g., fuse 331, capacitors 322, integrated circuit 324, and other components) associated with the driver circuit and the flicker reducing circuit can be positioned on the circuit board 300 at a location that does not interfere with light emitted from the LED devices 302. This can reduce shadowing effects in the light output from the lighting fixture 100 that may result from certain electronic components of the flicker reducing circuit or driver circuit (e.g., one or more capacitors) that can extend a greater distance from the circuit board 300 relative to the LED devices.

In certain embodiments, the temperature of the lighting fixture 100 may need to be regulated. LED devices 302 are known to produce heat, and an excessive output of this heat can transfer to the housing 110 and lens 142. This heat transfer can lead to unsafe conditions, especially in enclosed locations and where the light fixture 100 may come in contact with flammable material. For example, a low profile light fixture positioned in a closet or storage area may come in contact with material stacked on a shelf. If the material is flammable, prolonged contact can cause the material to ignite.

In order to prevent unsafe overheating, a temperature sensor can be operatively connected to the circuit board 300, and the circuit board 300 can be configured to reduce the output of the LED devices 302 if the sensor detects that one or more components of the lighting fixture approaches or reaches a maximum temperature. The sensor can monitor an external temperature of the lighting fixture 100 (e.g., the housing 110 or the lens 142), an internal temperature (e.g., the circuit board 300), or any combination thereof. Different temperature sensing devices can be used, including diodes, chip sensors, thermistors (e.g., PTC and NTC thermistors), and resistance temperature detectors.

The output of the LED devices 302 can be reduced from a first set amount to a second amount after passing or approaching one or more temperature thresholds. The output can be decreased in steps, a continuous linear amount, a continuous curved amount, or any combination therefore. The total decrease in output can be anywhere below 100% of the maximum output to 0% of the maximum output, or completely off. In some exemplary embodiments, the maximum temperature can be below 90 degrees Celsius. In some exemplary embodiments, the maximum temperature can be below 60 degrees Celsius. In some embodiments, the maximum temperature is between approximately 60-90 degrees Celsius.

According to an exemplary embodiment, as shown in FIG. 6, a temperature sensor 332 is mounted directly to the circuit board 300. The temperature sensor 332 can be a solid-state sensor that measures the temperature of the circuit board 300 and converts the temperature input into a proportional current output. The circuit board 300 can be configured so that at a set point the current output of the sensor 332 will trigger a reduction in the light output in any manner described above. Other types of contact and non-contact temperature sensors can be used (e.g., thermistor, resistance temperature detector, thermocouple, infrared). It is also noted that the concept of incorporating a temperature sensor on a printed circuit board for reducing light output at a set temperature can be incorporated into other light fixtures.

FIGS. 8-15 depict a light fixture 400 according to exemplary embodiment of the present disclosure. The light fixture 400 can be a surface mount, low profile light fixture. The light fixture 400 can include a fixture housing 402. The fixture housing 402 can be adapted to be surface mounted to a ceiling, wall, or other surface.

The illustrated embodiment of the fixture housing 402 is generally conical in shape. Those of ordinary skill in the art, using the disclosures provided herein, will understand that the lighting fixture 100 can include various curvilinear and rectilinear shapes and cross-section, without deviating from the scope of the present disclosure, such as rectangular shape, a square shape, a triangular shape, a polygonal shape, a spherical shape, etc. In certain embodiments the length dimension and depth dimension discussed above in connection to the light fixture 100 of FIGS. 1-5 can apply here.

Figure 9:
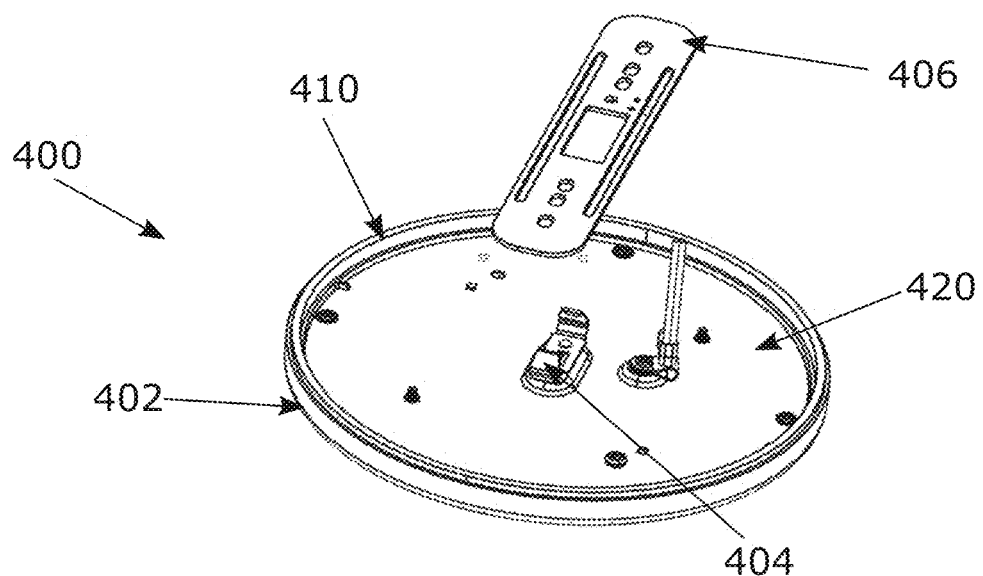
FIG. 9 depicts a top perspective view of the light fixture of FIG. 1 and a mounting bracket.

As best shown in FIG. 9, the light fixture 402 can include one or more spring clips 404 that can engage a bracket 406 in order to mount the light fixture 400 to a ceiling or other support. For instance, the bracket 406 can be secured to a junction box recessed within a ceiling. The spring clip 404 can engage the bracket 406 (e.g., by being inserted through an opening in the bracket 210) to retain the fixture 400 adjacent the surface. The spring clips 404 can form a rotatable connection with the bracket 406 so that the position of the light fixture 400 can be rotatably adjusted relative to the support. Other suitable mounting techniques can be used without deviating from the scope of the present disclosure.

Figure 10:
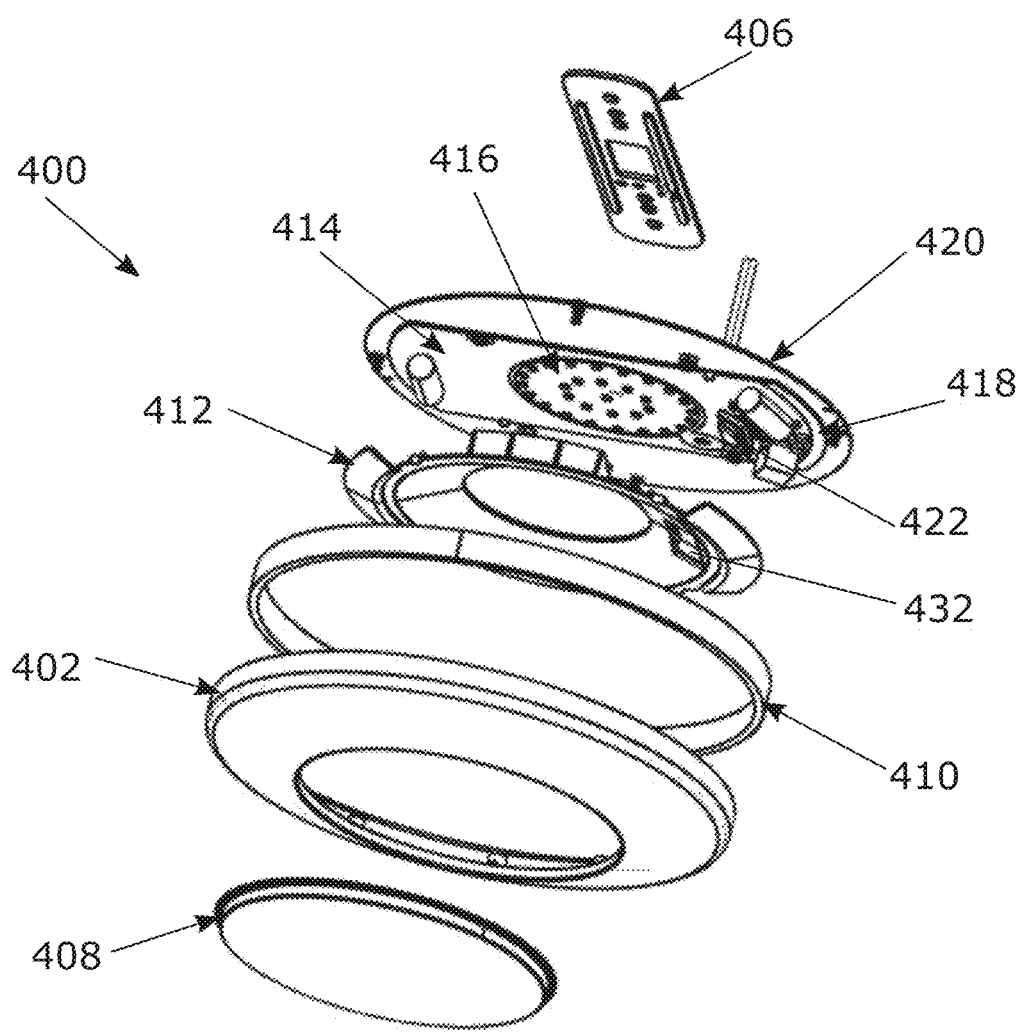
FIG. 10 depicts an exploded view of the light fixture of FIG. 8.
Figure 11:
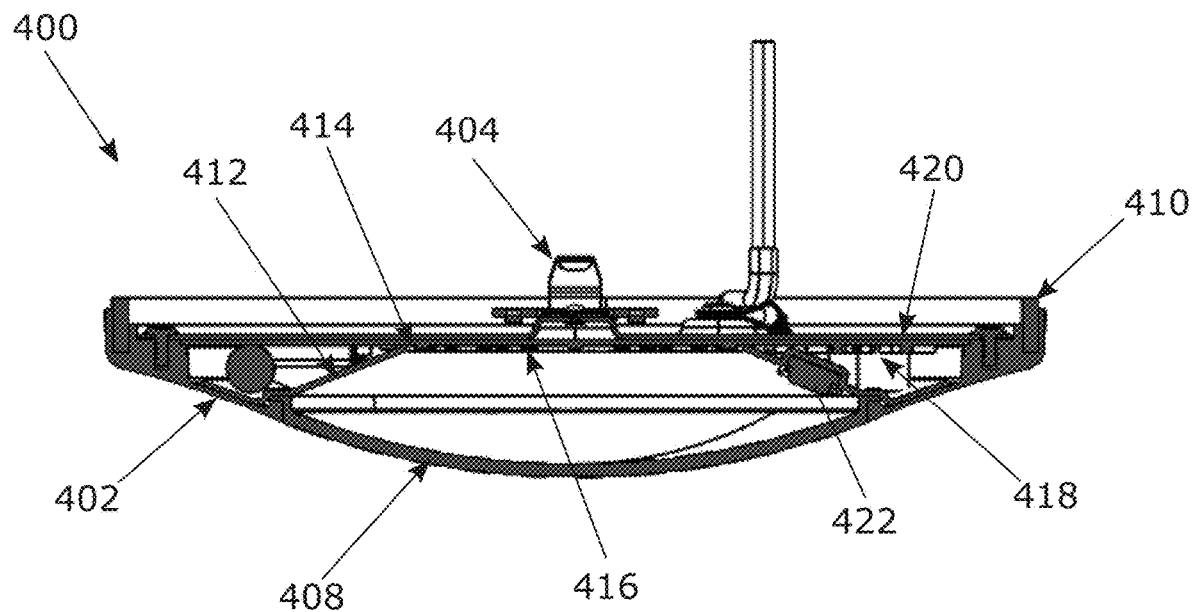
FIG. 11 depicts a sectional view of FIG. 1.

FIGS. 10 and 11 shows exemplary components associated with the light fixture 400. The light fixture 400 can include a lens 408, a gasket 410, a reflector 412, a circuit board 414 having one or more light emitters 416 (e.g., LEDs) and one or more electrical components 418 for controlling the light emitters 416, and a backing member 420.

The lens 408 can be used to protect internal components of the lighting fixture and/or to condition light emitted from one or more light emitters 416 mounted on circuit board 414 to provide a desired light output for the lighting fixture 400. The lens 408 can be, for instance, a glass, polycarbonate, acrylic, or silicone lens (with or without UV protection) or other suitable lenses. The lens can extend through a bottom opening in the housing 402 and can incorporate a connection with a gasket or other sealing member to help prevent ingress of water, dust, bugs, or other contaminates.

The light fixture 400 can include an upper gasket 410. The gasket 410 can provide a seal between a surface to which the lighting fixture 400 is mounted and the fixture housing 420 so that dust, moisture, bugs, water, and/or other elements are prevented from entering the interior of the fixture housing 402. In this way, internal components (e.g., circuit board 414) can be protected from damage from external sources. The gasket 410 can be positioned in a recessed rim or channel formed in an upper portion of the housing 402 as best shown in FIG. 11.

The circuit board 414 can be mounted on the backing member 420, with the backing member 420 connected to the housing 402, for example, using one or more fasteners. The backing member 420 can act as a heat sink that is configured to transfer heat away from the circuit board 414. In such cases, the backing member 420 can include any suitable heat conducting material, such as a metal material. In some embodiments, the backing member 420 can be integrally formed with the circuit board 414. The circuit board 414 can be associated with a light engine that includes all of the necessary electronic components for powering the one or more light emitters 416 located on the circuit board 414. The circuit board 414 can include any combination of components discussed herein. For example, the electronic components can include a driver circuit, a dimmer circuit, and a filter circuit.

As discussed above, in order to prevent unsafe overheating, a temperature sensor 422 can be connected to the circuit board 414, and the circuit board 414 can be configured to reduce the output of the light emitters 416 if the sensor detects that one or more components of the lighting fixture approaches or reaches a maximum temperature. The sensor can monitor an external temperature of the lighting fixture 400 (e.g., the housing 402 or the lens 408), an internal temperature (e.g., the circuit board 414), or any combination thereof.

In the illustrated embodiment, the temperature sensor 422 includes a bi-metal temperature sensor. The bi-metal temperature sensor can act as a switch that is close up to a certain temperature, and then opens once a temperature threshold is crossed, resulting in a reduced power supply to the light emitters 416. The temperature sensor 422 can be connected to the circuit board 414 and configured to monitor the temperature of the circuit board 414. Control circuitry associated with the circuit board 414 can be configured to adjust the output of the light emitters 416 in response to an output signal from the temperature sensor 422 as discussed herein.

Figure 12:
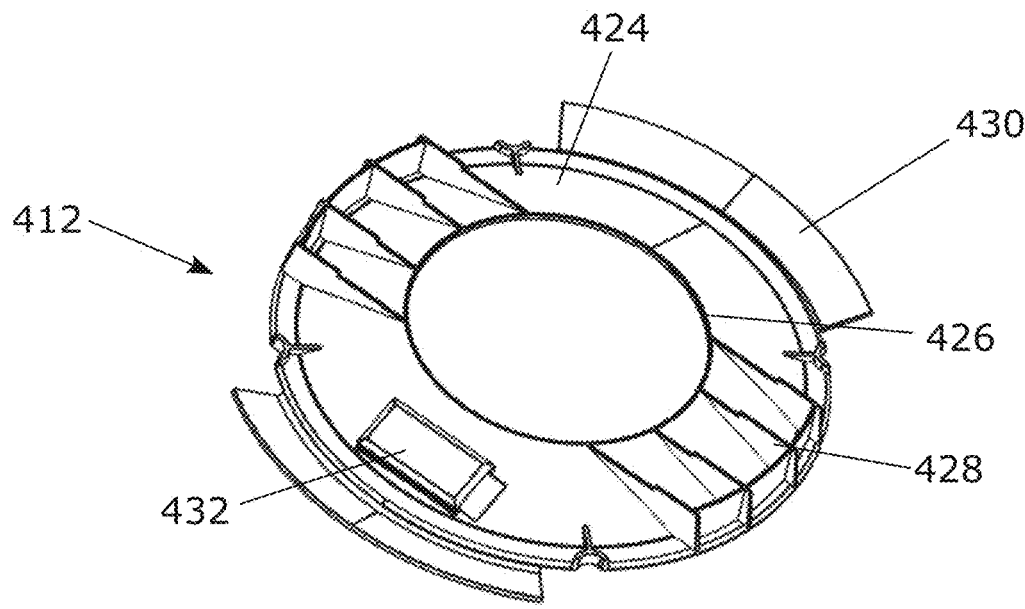
FIG. 12 depicts a top perspective view of a reflector.
Figure 13:
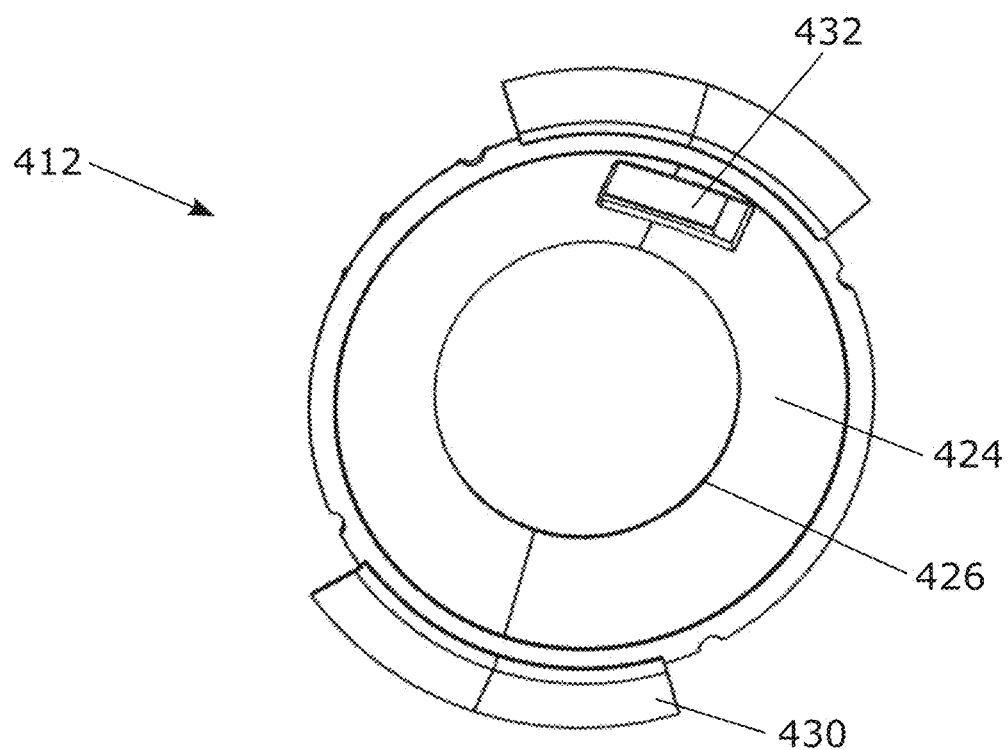
FIG. 13 depicts a bottom perspective view of FIG. 12.
Figure 14:
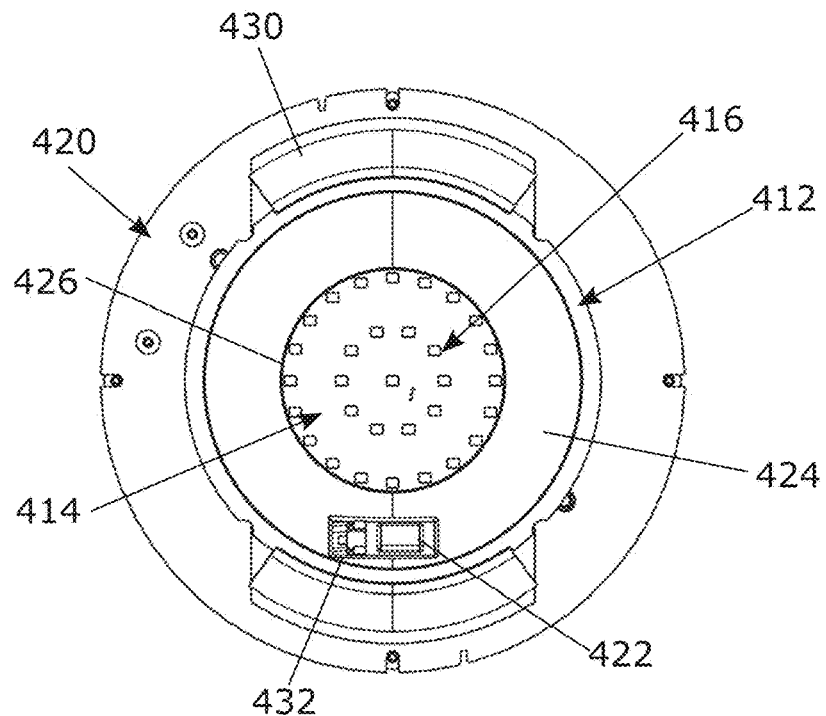
FIG. 14 depicts a bottom view of the light fixture of FIG. 8 with the housing and lens removed.

In some embodiments, the reflector 412 can be positioned between the housing 402 and the circuit board 414 and the backing member 420. The configuration of the reflector 412 can be dependent on the configuration of the housing 402 and the light emitters 416. In the illustrated embodiment, as best shown in FIGS. 12 and 13, the reflector 412 includes a central portion 424 having a substantially conical configuration with a central opening 426. The central opening 426 is configured to be positioned around the light emitters 416, with an edge defining the central opening 426 in direct engagement with, or adjacent the circuit board 414. The central portion 424 extends at an oblique angle away the circuit board 414 from the central opening 426 to an outer rim.

One or more ribs 428 extend from the central portion 424 toward the circuit board 414 and backing member 420. The ribs 428 can provide support for spacing the reflector 412 from the circuit board 414 and backing member 420. The ribs 428 can also act as heat fins to help transfer heat from the circuit board 414 to the housing 402 for dissipation to an external environment. One or more outer flanges 430 also extend from the central portion 424 toward the circuit board 414 and backing member 420. The outer flanges 430 can form an enclosure for electrical components positioned on the circuit board 414.

In certain embodiments, a sensor housing 432 can be provided on the reflector to receive the temperature sensor 422. The sensor housing 432 can extend from an outer surface of the central portion 424 toward the circuit board 414. A slot adjacent the sensor housing 432 can provide communication between the sensor housing 432 and the circuit board 414. The temperature sensor 422 can be connected to the circuit board 414 and extend through the slot to be positioned in the sensor housing 432. In this way, a body of the temperature sensor 422 can be separated from the circuit board 414 by the reflector 412.

Figure 15:
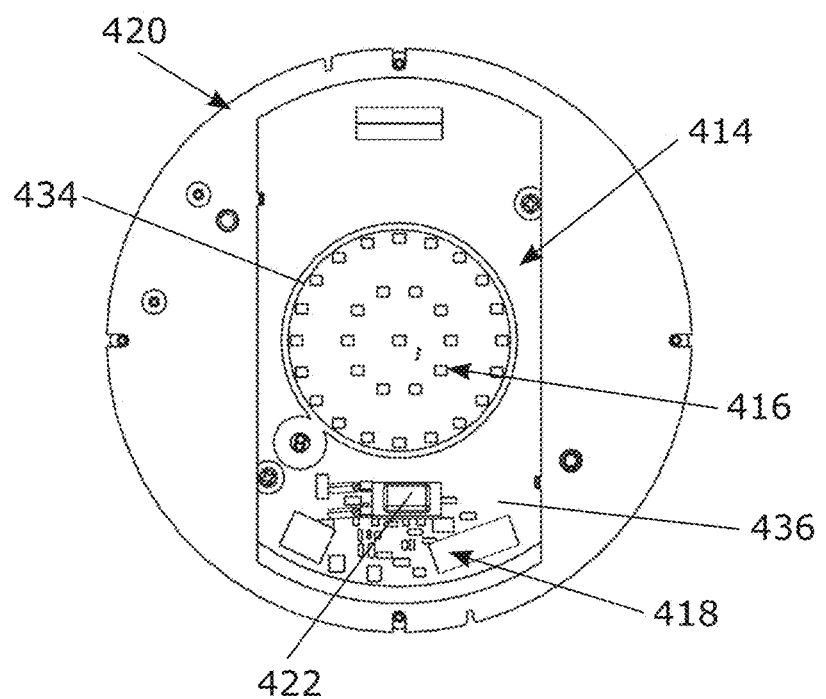
FIG. 15 depicts a bottom view of the light fixture of FIG. 8 with the housing, lens, and reflector removed.

FIG. 15 depicts an example circuit board layout for circuit board 414 according to example embodiments of the present disclosure. As shown, the circuit board 414 includes a plurality of light emitters 416 (e.g. LED devices). The light emitters 416 are arranged as a circular array in a first portion 434 of the circuit board 414. The circuit board 414 also includes electronic components 418 for providing and conditioning power to the plurality of light emitters 416. For instance, the circuit board 414 can include electronic components associated with a driver circuit and one or more filter circuits (e.g., including one or more capacitors). The filter circuit(s) can be associated with, for instance, a flicker reducing circuit for reducing flicker in the light output of the LED devices. In some embodiments, the light emitters 416 can correspond to the shape of the housing, for example a rectangular light emitters 416 can be used with a rectangular lighting fixture.

As shown in FIG. 15, the electronic components 518 associated with driver circuit and flicker reducing circuit can be located in a second portion 436 of the circuit board 414. The second portion 436 of the circuit board 414 can be disposed in a separate location of the circuit board 414 relative to the first portion 434 of the circuit board 414 such that none of the electronic components associated with the driver circuit or the flicker reducing circuit are located in the first portion 434 of the circuit board 414. In the example of FIG. 15, the first portion 434 of the circuit board 414 can be located in a center portion of the circuit board 414. The second portion 436 can be located in a peripheral portion of the circuit board 414.

Figure 16:
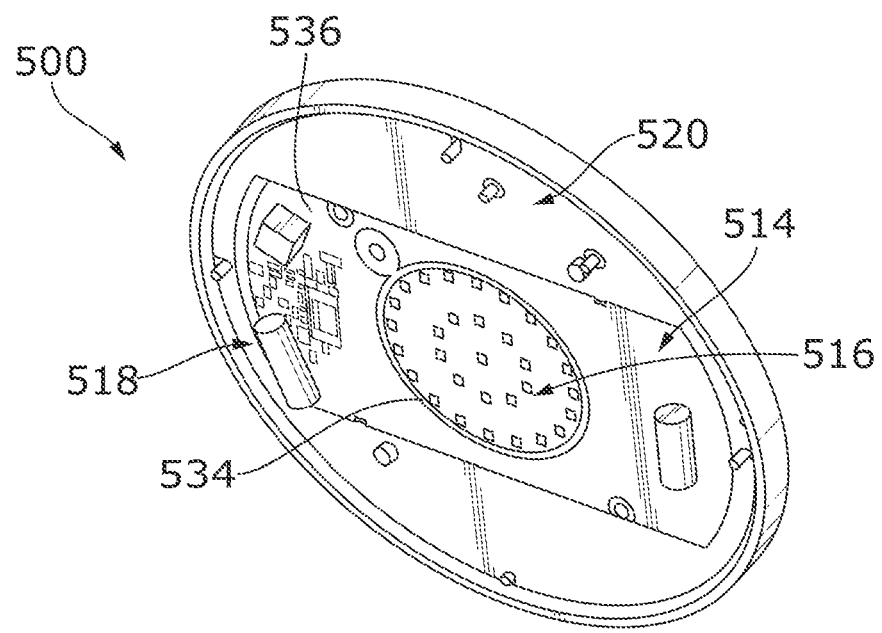
FIG. 16 depicts a bottom perspective view of another light fixture showing a circuit board layout.
Figure 17:
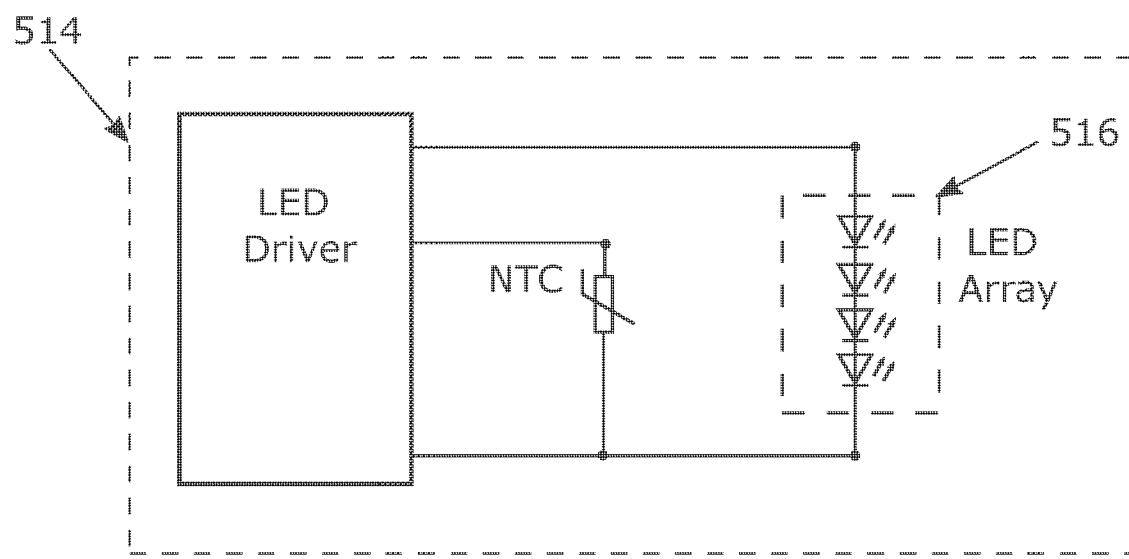
FIG. 17 is a schematic circuit diagram of temperature monitored LED array utilizing a drive circuit and an NTC thermistor.

FIGS. 16 and 17 show portions of another exemplary embodiment of a light fixture 500. The light fixture 500 can have substantially the same configuration as the light fixture 400 shown in FIGS. 8-15. The light fixture 500 includes a circuit board 514 having a plurality of light emitters 516 and electrical control components 518 connected to a backing member 520. The light emitters 516 are positioned in a first portion 534 of the circuit board 514 and the control components 518 are positioned in a second portion 536 of the circuit board 514 space from the first portion 534.

The light fixture 500 incorporates a thermistor temperature sensor associated with the circuit board 514. For example, a negative temperature coefficient (NTC) thermistor can be used. As shown in the schematic of FIG. 17, the NTC thermistor can be incorporated into the control circuit on the low voltage side of the light emitters (e.g., LEDs) and provide feedback to the main driver circuit based on a sensed temperature. The feedback can signal the driver to reduce or cutoff power to the light emitters 516 as disused herein. In some embodiments, the NTC thermistor is positioned in the first portion 534 of the circuit board 515. FIG. 17 shows a schematic of the driver circuit, LED array, and NTC thermistor only. Those of ordinary skill viewing this disclosure will understand that other electrical components can be incorporated into the system to provide desired functionality and light output.

In some embodiments, the NTC thermistor is incorporated into the circuit board at a substantially center region of the light emitters 516. For example, when the light emitters 516 are arranged in a circular array as shown in FIG. 15, the NTC thermistor can be positioned near a center point of the circle. In other configurations, the NTC thermistor can be positioned in region defined by the center of t length or width dimension of the light emitter array 516.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present disclosure, and are not intended to limit the structure of the exemplary embodiments of the present disclosure to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

What is claimed:
1. A lighting fixture comprising:
a fixture housing;
a circuit board positioned in the fixture housing, the circuit board connected to a driver circuit;
a plurality of light emitters disposed on the circuit board, the light emitters operatively connected to the driver circuit to produce a light output;
a reflector extending between the circuit board and the fixture housing, the reflector having a central portion and a sensor housing extending from the central portion;
a temperature sensor disposed on the circuit board and extending into the sensor housing, the temperature sensor configured to measure a temperature of the circuit board and output a signal; and
a lens connected to the fixture housing over the circuit board and the reflector,
wherein the driver circuit is configured to reduce the light output in response to the signal from the temperature sensor.

2. The lighting fixture of claim 1, wherein the signal includes a current output.

3. The lighting fixture of claim 1, wherein the temperature sensor includes a solid-state temperature sensor.

4. The lighting fixture of claim 1, wherein the temperature sensor includes a bi-metal temperature sensor.

5. The lighting fixture of claim 1, wherein the temperature sensor includes an NTC thermistor.

6. The lighting fixture of claim 1, wherein the driver circuit is configured to reduce the light output when the signal passes a threshold value indicating a maximum temperature of the circuit board.

7. The lighting fixture of claim 6, wherein the maximum temperature is below 90 degrees Celsius.

8. The lighting fixture of claim 1, wherein the light output is reduced to approximately 50% of a maximum output.

9. The lighting fixture of claim 1, wherein the light output is reduced to 0% of a maximum output.

10. The lighting fixture of claim 1, wherein the reflector is positioned between the temperature sensor and the circuit board.

11. A lighting fixture comprising:
a fixture housing;
a circuit board positioned in the fixture housing, the circuit board including a driver circuit;
a reflector extending between the circuit board and the fixture housing, the reflector having a central portion and a sensor housing extending from the central portion;
a plurality of light emitters disposed on the circuit board, the light emitters operatively connected to the driver circuit to produce a light output;
a temperature sensor connected the circuit board and extending into the sensor housing, the temperature sensor configured to measure a temperature of the circuit board and output a signal,
wherein the driver circuit is configured to reduce the light output in response to the signal from the temperature sensor.

12. The lighting fixture of claim 11, wherein the signal includes a current output.

13. The lighting fixture of claim 11, wherein the temperature sensor includes a bi-metal temperature sensor.

14. The lighting fixture of claim 11, wherein a slot is formed in the central portion of the reflector and the temperature sensor extends through the slot into the sensor housing.

15. The lighting fixture of claim 11, wherein the driver circuit is configured to reduce the light output when the signal passes a threshold value.

16. The lighting fixture of claim 15, wherein the light output is reduced to 0% of a maximum output.

17. A lighting fixture comprising:
a fixture housing;
a circuit board positioned in the fixture housing;
a plurality of light emitters disposed on a first portion of the circuit board;
a driver circuit disposed on a second portion of the circuit board, the driver circuit operatively connected to the light emitters to produce a light output; and
a temperature sensor disposed on the first portion of the circuit board, the temperature sensor configured to measure a temperature of the circuit board and output a signal,
wherein the driver circuit is configured to reduce the light output in response to the signal from the temperature sensor, and
wherein the first portion of the circuit board is spaced from the second portion of the circuit board, and wherein the first portion is positioned closer to a center of the circuit board than the second portion.

18. The lighting fixture of claim 17, wherein the temperature sensor includes an NTC thermistor.

19. The lighting fixture of claim 17, wherein the driver circuit is configured to reduce the light output when the signal passes a threshold value.

20. The lighting fixture of claim 17, wherein the light output is reduced to between approximately 50% and 0% of a maximum output.

* * * * *